United States Patent [19]

Fielding et al.

[11] Patent Number: 4,895,134

[45] Date of Patent: Jan. 23, 1990

[54] DEVICE FOR THE COLLECTION OF ASHES FROM A KETTLE-TYPE OF BARBECUE GRILL

[75] Inventors: Douglas Fielding; Charles S. Adams, both of Oakland, Calif.

[73] Assignee: Charcoal Companion, Berkeley, Calif.

[21] Appl. No.: 345,484

[22] Filed: May 1, 1989

[51] Int. Cl.⁴ .............................................. F23J 1/00
[52] U.S. Cl. .................................. 126/243; 126/25 R
[58] Field of Search ..................... 126/9 R, 9 B, 25 R, 126/242–245, 160; 110/166; 220/41, 7

[56] References Cited

U.S. PATENT DOCUMENTS

| | | | |
|---|---|---|---|
| 773,173 | 10/1904 | Vose | 126/242 |
| 1,867,080 | 7/1932 | Kraft | 126/243 |
| 3,126,881 | 3/1964 | Blotsky, Jr. | 126/245 |
| 3,209,743 | 10/1965 | Stewart et al. | 126/25 B |
| 4,628,901 | 12/1986 | Poulos | 126/25 R |
| 4,741,322 | 5/1988 | Lin | 126/242 |
| 4,763,640 | 8/1988 | Schnack et al. | 126/243 |

Primary Examiner—James C. Yeung
Attorney, Agent, or Firm—Owen, Wickersham & Erickson

[57] ABSTRACT

An ash collector for the collection of ashes from a kettle-type grill. The ash collector is inverted, is frustoconical with a large top opening, and it tapers down to a smaller bottom opening. It has a large horizontal slot about half the width of the ash collector and a small slot opposite the larger slot. It has a non-combustible disk slidable in the large slot, and the disk effectively closes the bottom opening, when the disk is inserted fully into the large slot. The disk has a locking tab for engagement with the small slot to hold the disk horizontally in place and to close off completely the bottom opening. Preferably the ash collector is used with a supporting assembly and a kettle-type grill resting on the supporting assembly. The assembly has legs to which the collector is secured, so that when ashes fall through vent holes at the bottom of the kettle-like grill, the ashes fall into the conical ash collector and onto the disk.

6 Claims, 2 Drawing Sheets

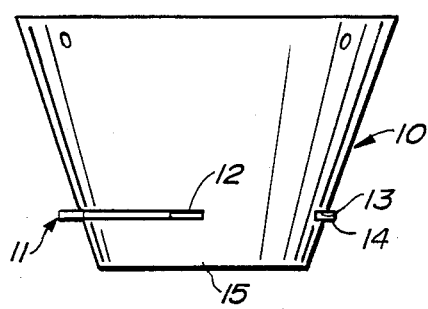
FIG._1.
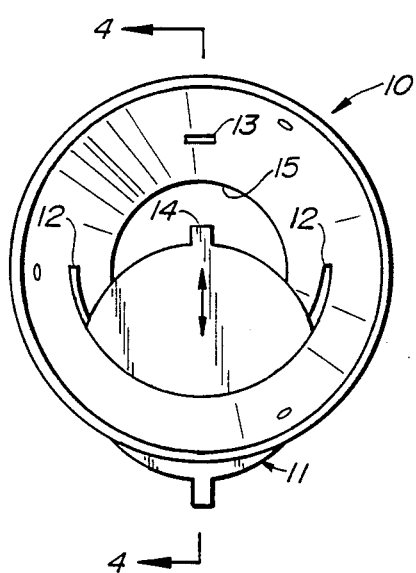
FIG._2.
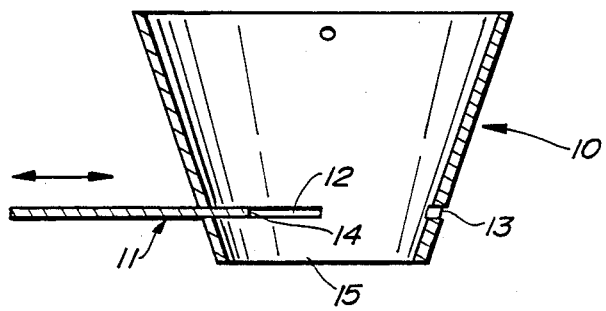
FIG._4.
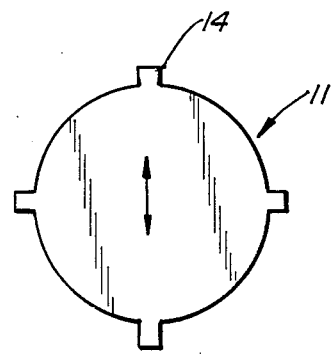
FIG._3.

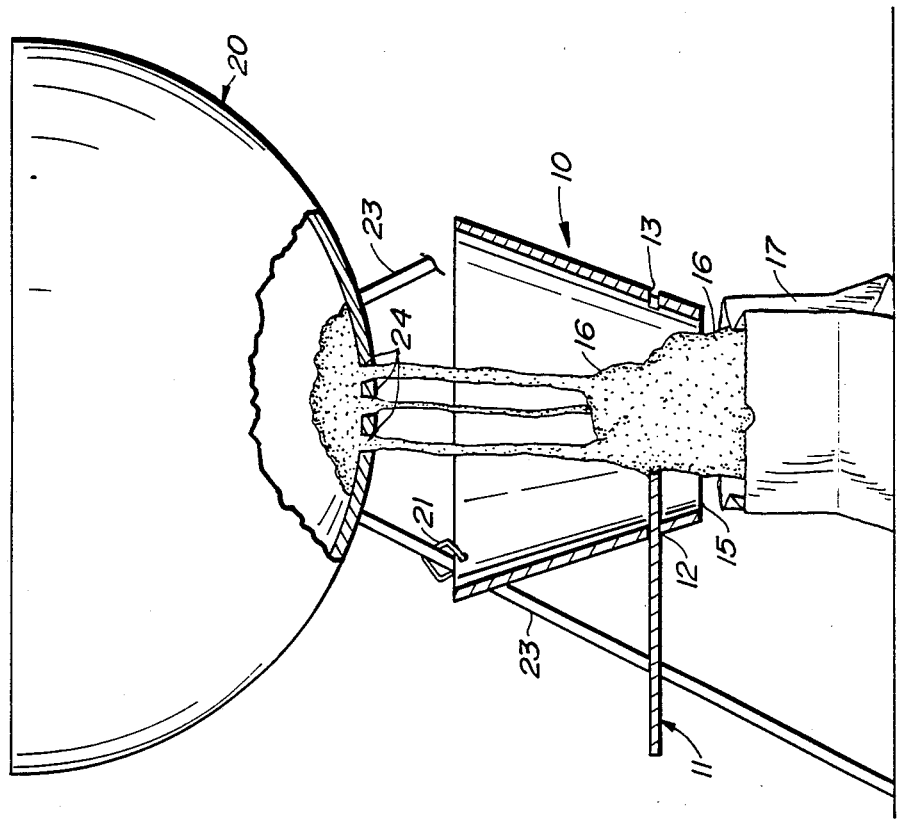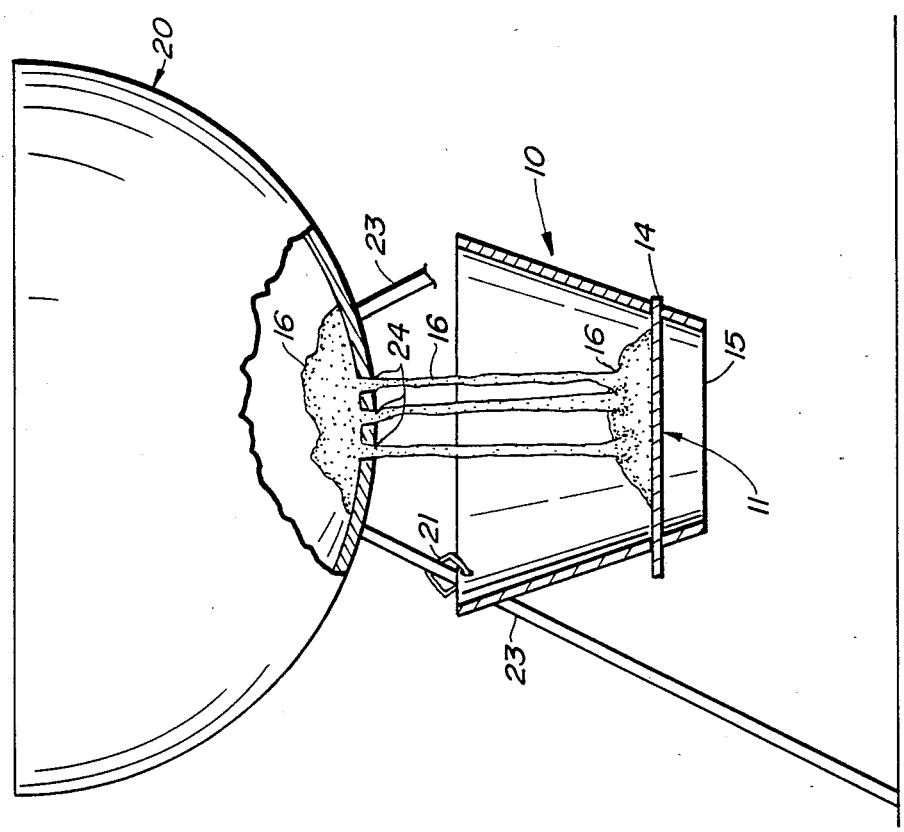

DEVICE FOR THE COLLECTION OF ASHES FROM A KETTLE-TYPE OF BARBECUE GRILL

This invention relates to a device for collecting ashes from a kettle-type grill.

BACKGROUND OF THE INVENTION

Those who barbecue with a charcoal grill have to empty the grill's ashes on a regular basis. This is usually done by removing the grates used for holding the charcoal and for doing the cooking; then the ashes are either scooped from the grill into a suitable container or the entire grill is turned upside down over a garbage can or over a newspaper. Neither of these processes is neat, and it usually results in a considerable amount of wind-blown ash.

Some grill manufacturers have attempted to address this problem. One company uses a shallow, slightly concave dish to catch the ashes as they fall through the vent holes from the grill. Another company developed a pan which was internal to the grill and served as a collection vessel, so that the ashes could be removed simply by lifting the pan from the inside of the grill.

The former device is so shallow the wind-blown ash is still a problem, and the device has a very limited capacity. In addition, removal of the device from the grill inevitably results in some spilled ashes.

The latter device, though no longer on the market, was limited closely to one type of grill and has the usual disadvantages.

An object of the invention is to provide a device which is easily used by anybody and is adaptable to most kettle-type grills that are currently on the market.

Another object of the invention is to provide an ash collecting device which can collect ashes from the bottom of kettle-type grills.

An additional object of the invention is to provide an ash collecting device that will hold a sufficient volume of ashes so that it does not have to be removed very often.

Another object of the invention is to provide an ash collector which enables the removal of ashes from the bottom of a kettle-type grill without having to remove the device or touch the ashes.

SUMMARY OF THE INVENTION

The product of the invention collects ashes from the bottom of a kettle-type grill by letting the ashes fall down through vent openings into the bottom of a cone about 8 to 12 inches high and with an upper opening about 5 to 10 inches wide and having a bottom opening about 4 to 10 inches in diameter. This conical ash collector is suspended from some legs that support the grill. The ash collector lies below the vent openings at the bottom of the kettle-type grill and is made from non-combustible material Close to the bottom of the frustoconical ash collector is a non-combustible (e.g., metal) disk which mates with and slides back and forth along a slot in the cone walls, so that the disk can substantially close the bottom of the cone when the disk is inserted into the slot.

The entire assembly is preferably attached to the legs of the kettle-like grill, as by wire clips. The conical ash collector catches the ashes that fall through the vent holes at the bottom of the kettle, and they fall down onto the cone and on top of the disk. By placing a container below the disk and then removing the disk or sliding it to open the bottom of the cone, the ashes drop into the container without the user having to remove, or to scoop out, the ashes from the barbecue grill or having to handle them in any way.

BRIEF DESCRIPTION OF THE DRAWINGS

FIG. 1 is a view in side elevation of a frustoconical ash collector embodying the principles of the invention.

FIG. 2 is a top plan view of the frustoconical ash collector. This normally closes the bottom slot partly to one side.

FIG. 3 is a top plan view of the disk which is used in the horizontal slot of the frustoconical ash collector to close the bottom thereof.

FIG. 4 is a view in elevation and in section of the frustoconical ash collector and its disk, showing the disk being installed or removed and slid to one side.

FIG. 5 is a view in elevation and partly in section of a kettle-type barbecue grill with ashes falling down from the kettle through vent holes into the ash collector of the invention, the disk being in place to close the collector's lower end.

FIG. 6 is a similar view with the disk slid to the left to open most of the bottom of the ash collector to let ashes fall down from the ash collector of the invention into a container below the ash collector; this container may then be used to remove the ashes.

DESCRIPTION OF THE PREFERRED EMBODIMENT

The device of the present invention solves many of the problems of ash removal that have been encountered by other devices for collecting ashes from barbecue grills.

A conical ash collector 10 of this invention comprises a deep funnel or frustum of an inverted cone 10 with a slidable bottom plate 11, as shown in FIG. 1. The cone 10 has a large slot 12 near its bottom end along almost half its periphery, sufficiently large to accommodate and support the disk 11 when the latter is slid into or out from it on a horizontal plane. Directly opposite the larger slot 12 is a small locking soot 13, which receives a tab-like portion 14 of the disk 11 (see FIG. 3).

When the disk 11 is in place in the slots 12 and 13, as in FIG. 1, it closes off the otherwise open bottom end 15 of the cone 10 and prevents ashes from falling onto the ground or to other things below the cone 10. However, the slidable plate-like disk 11 may be removed, either completely or partially by manually sliding the disk 11 part or all of the way through the larger slot 12, as in FIGS. 2 and 4, and the bottom 15 of the cone 10 is then opened either fully or enough so that ashes 16 therein can fall out into a bag 17 or other receptacle (FIG. 6). The bag 17 can then be taken to and disposed of in a trash container. The conical device 10 itself does not have to be removed from its attachment to the legs 23 of a tripod or other assembly supporting a kettle-like grill 20 in order to dispose of the ashes, and the disk 11 can be slid back in place to close the collector 10 as soon as the ashes have fallen out through the bottom 15. The ash collector 10 is made to fit practically every type of kettle-type grill 20 currently on the market.

The slots 12 and 13 of the conical ash collector 10 are preferably between ¼ of an inch and 3 inches above the bottom 15 of the cone 10, so that the disk 11 can mate with the slots 12 and 13 in the cone 10 and can enable the disk 11 to close off the bottom 15 of the ash collector 10.

The disk 11 is inserted in the larger slot 12 and slid so that the tab 14 is inserted into the slot 13. A series of wire clips 21 may be provided for attaching the ash collector 10 by means of openings 22 through the ash collector 10 to each of the legs 23 of the kettlesupporting assembly. The clips 21 are preferably made from wire and are attached so that when ashes 16 fall through vent holes 24 at the bottom of the kettle 20, they fall into the ash collector 10 and normally onto the disk 11, which closes the bottom opening 15.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

What is claimed is:

1. A device for the collection of ashes from a kettle-type grill, including in combination:
   an inverted frustoconical ash collector with a large top opening, tapering down to a smaller bottom opening, said frustoconical ash collector having a large horizontal slot about half the width thereof and a small slot opposite said larger slot, and
   a non-combustible disk slidable in the large slot, the disk effectively closing said bottom opening, when the disk is inserted fully into the large slot, said disk having a locking tab for engagement with said small slot to hold said disk horizontally in place and to close off completely said bottom opening.

2. The device of claim 1 for use with a supporting assembly and a kettle-type grill resting on said supporting assembly, said assembly having legs, comprising
   clip means for attaching said frustoconical ash collector to said legs, so that when ashes fall through vent holes, at the bottom of the kettle-type grill, the ashes fall into said conical ash collector and onto said disk.

3. A device for the collection of ashes from a kettle-type grill, including in combination:
   a frustoconical ash collector about 5 to 10 inches high with a large top opening, about 8 to 12 inches wide tapering down to a bottom opening about four to ten inches in diameter, said frustoconical ash collector being made of a non-combustible material, a large slot through the frustoconical ash collector about half the width thereof, said slot being one quarter to three inches above the bottom opening, and a small slot diametrically opposite said larger slot, and
   a non-combustible disk slidable into and along said slot, so that the disk effectively closes said bottom opening, when the disk is inserted into and slid along the slot, said disk having a locking tab for engagement with said small slot to hold said disk horizontally in place and to close off said bottom opening.

4. The device of claim 3 for use with a kettle-type grill and a support for said grill, said support having legs,
   said frustoconical ash collector having clip means for attaching said frustoconical ash collector to said support legs,
   so that when ashes fall through vent holes at the bottom of the kettle-type grill, the ashes fall into said frustoconical ash collector and onto said disk.

5. A device for the collection of ashes that fall through vent openings at the bottom of a kettle-type grill, including in combination:
   a frustoconical ash collector with a large top opening, about 8 to 12 inches wide, and tapering from a height of about five to ten inches down to a bottom opening about four to ten inches in diameter.
   said frustoconical ash collector being made of a non-combustible material and having a large slot therethrough about half the width of the said collector and one quarter to 3 inches above the bottom of the ash collector, said collector also having a small slot diametrically opposite said larger slot, and a non-combustible disk slidable along with the large slot in the collector and when the disk is inserted into the slot, said disk having a locking tab for engagement with said small slot to hold said disk horizontally and so that the disk effectively closes the bottom of the collector.

6. The claim 5 device said kettle-type grill being in combination with a supporting assembly having a plurality of legs, said combination including clip means for attaching said frustoconical ash collector to said legs, so that when ashes fall down through the vent holes at the bottom of the kettle-type grill the ashes fall into said frustoconical ash collector and onto said disk.

* * * * *